July 7, 1936.  T. V. FOWLER, JR., ET AL  2,046,816
CONVERTER
Filed April 29, 1930  3 Sheets-Sheet 1

INVENTORS
B. M. CARTER
T. V. FOWLER, JR
BY  A. M. HARKNESS
H. F. MERRIAM
ATTORNEY

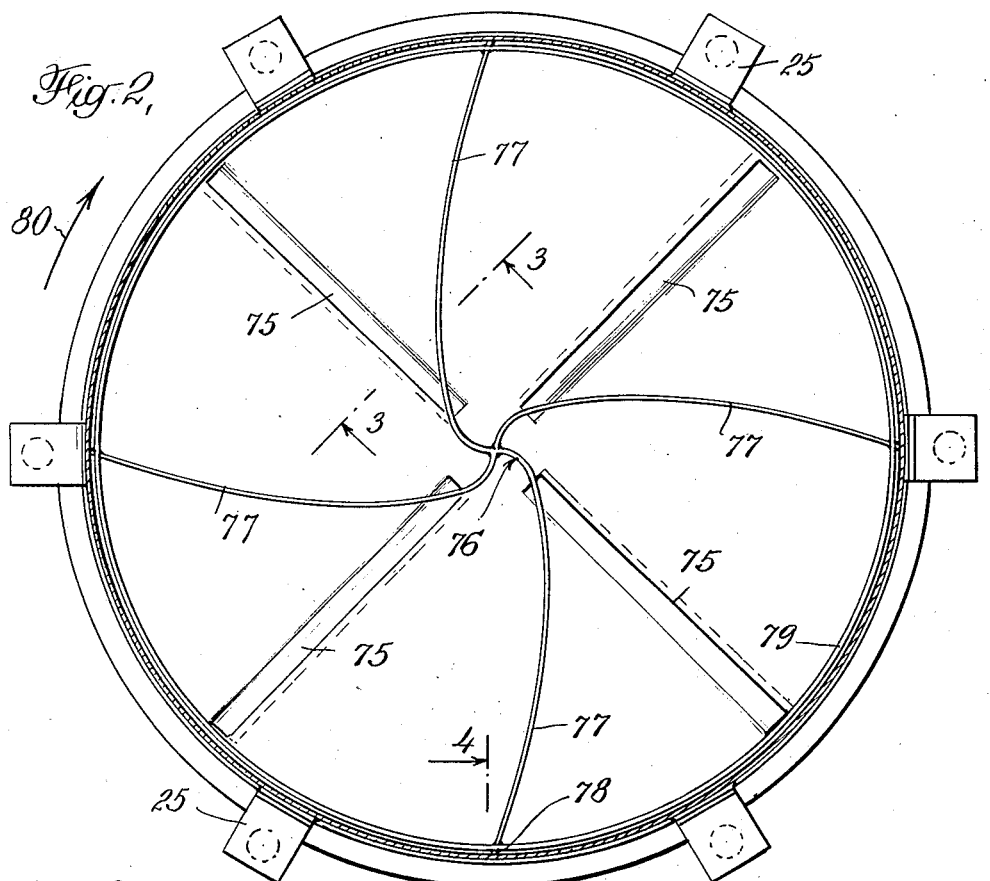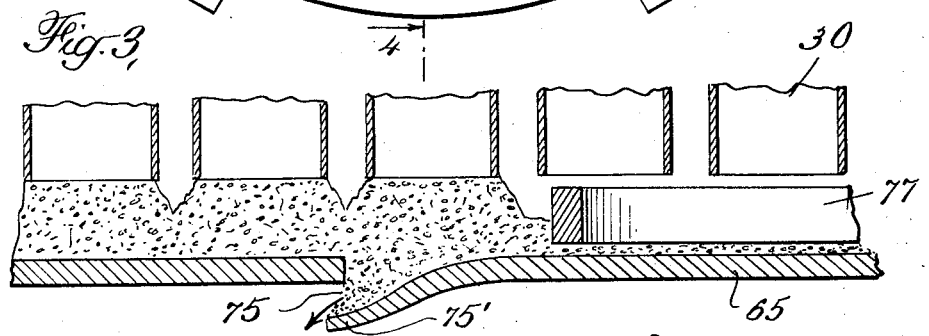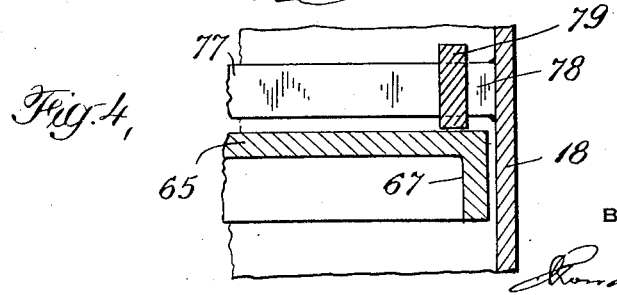

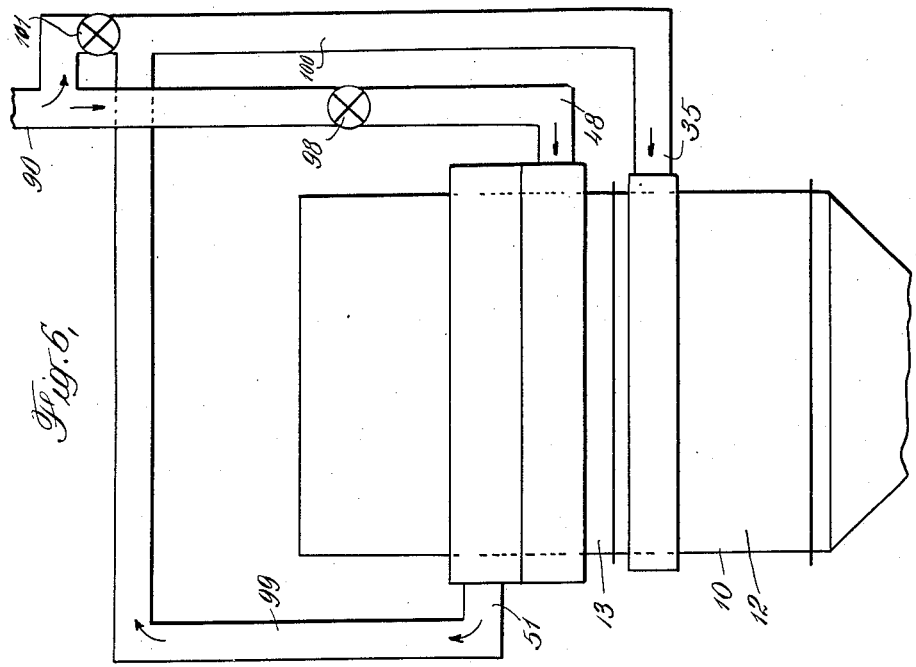
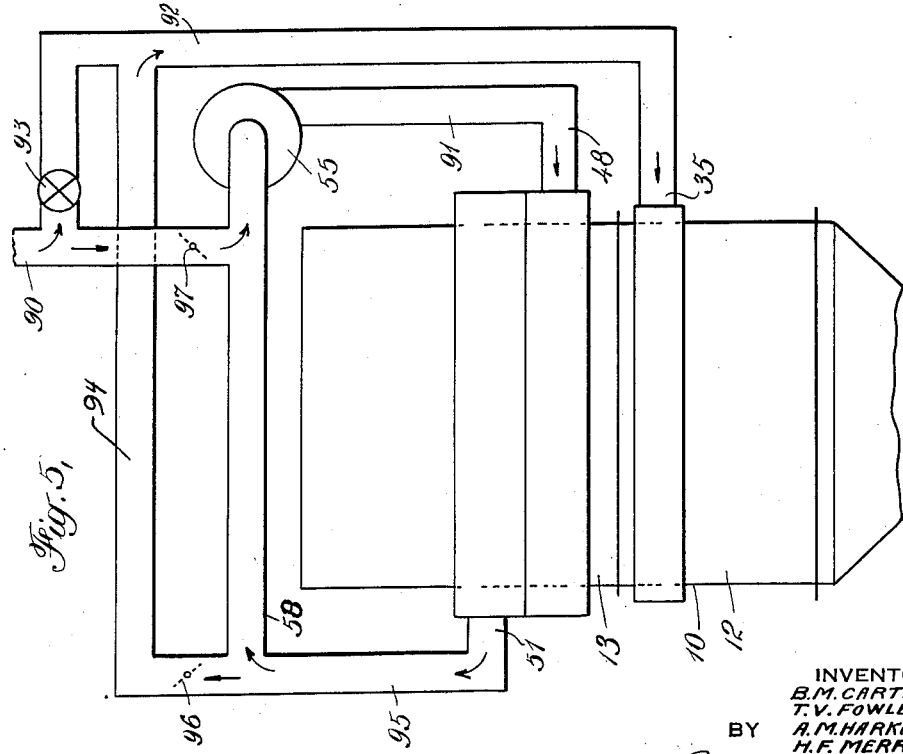

Patented July 7, 1936

2,046,816

UNITED STATES PATENT OFFICE 2,046,816

CONVERTER

Theodore V. Fowler, Jr., Pelham, and Andrew M. Harkness, Nyack, N. Y., and Henry F. Merriam, West Orange, and Bernard M. Carter, Montclair, N. J., assignors to General Chemical Company, New York, N. Y., a corporation of New York Application April 29, 1930, Serial No. 448,326

4 Claims. (Cl. 23—288)

The invention relates to catalytic processes and apparatus, and particularly to such as are suitable for the conversion of sulfur dioxide to sulfur trioxide by the contact process.

It is well known that reactions of the type referred to are exothermic, and that during the oxidation of a gas by passage thereof through a body of catalytic material, more heat is generated than is necessary for the completion of the reaction, with the result that partial dissociation of the product is effected, and an efficient conversion not obtained. According to the prior practice, it has been customary to carry out such reactions by passing the gas through two or more converters arranged in series with a heat exchange device interposed between two successive converters for the purpose of removing the excess heat of reaction developed in a preceding converter, so that the gas entering a succeeding converter is cooled to a temperature favorable for oxidation of unconverted gases. It has also been proposed to carry out such reactions in apparatus arranged so that cooling gases are circulated in contact with the exterior of the chambers containing the catalytic material by which the reaction is effected. As far as we are aware, the prior methods and apparatus have been such that it has been difficult to maintain proper temperature control throughout the entire process of conversion.

One of the principal objects of the present invention lies in the provision of a process by which proper regulation of the temperature of an oxidation reaction may be effected by carrying out the conversion in two or more stages. According to the invention, the temperature of the reaction in the first stage is controlled, and the reacting gas preheated prior to its introduction into the reaction chamber of the first stage, by circulating the untreated gas in heat transfer relation with the catalytic material in the first stage, at the same time causing the untreated gas to flow counter current to the gas passing through the reaction chamber, and then controlling the temperature of the reaction in the second stage by means of a cooling medium flowing co-currently with the gases passing through the reaction chamber of the second stage.

Another object of the invention is to provide apparatus suitable for carrying out the improved process. It is another object of the invention to provide a converter construction by which the reaction chambers or converter tubes may be filled with catalytic material through an opening in the top of the converter, by which spent catalytic material may be gradually withdrawn from the converter tubes and replaced with fresh material, and by which the spent material may be finally withdrawn from the converter, all in such manner that the catalytic material in the converter may be completely changed with a minimum interruption of the conversion process. A further object of the invention lies in the provision of a converter construction by which the gas entering the converter first comes in contact with a large surface area of fouled or partially fouled catalytic material which serves to filter impurities from the gas, thus avoiding rapid accumulation of resistance to gas flow through the catalyst at the mouth of the conversion tubes.

Other objects and features of novelty will be apparent from the following description when considered in connection with the accompanying drawings, in which Fig. 1 is a vertical section of a converter embodying the present invention;

Fig. 2 is a horizontal section on the line 2—2 of Fig. 1;

Fig. 3 is an enlarged vertical section on the line 3—3 of Fig. 2;

Fig. 4 is an enlarged vertical section on the line 4—4 of Fig. 2;

Figs. 5 and 6 illustrate diagrammatically alternative modes of circulating reactant gases through the apparatus.

Figure 1:
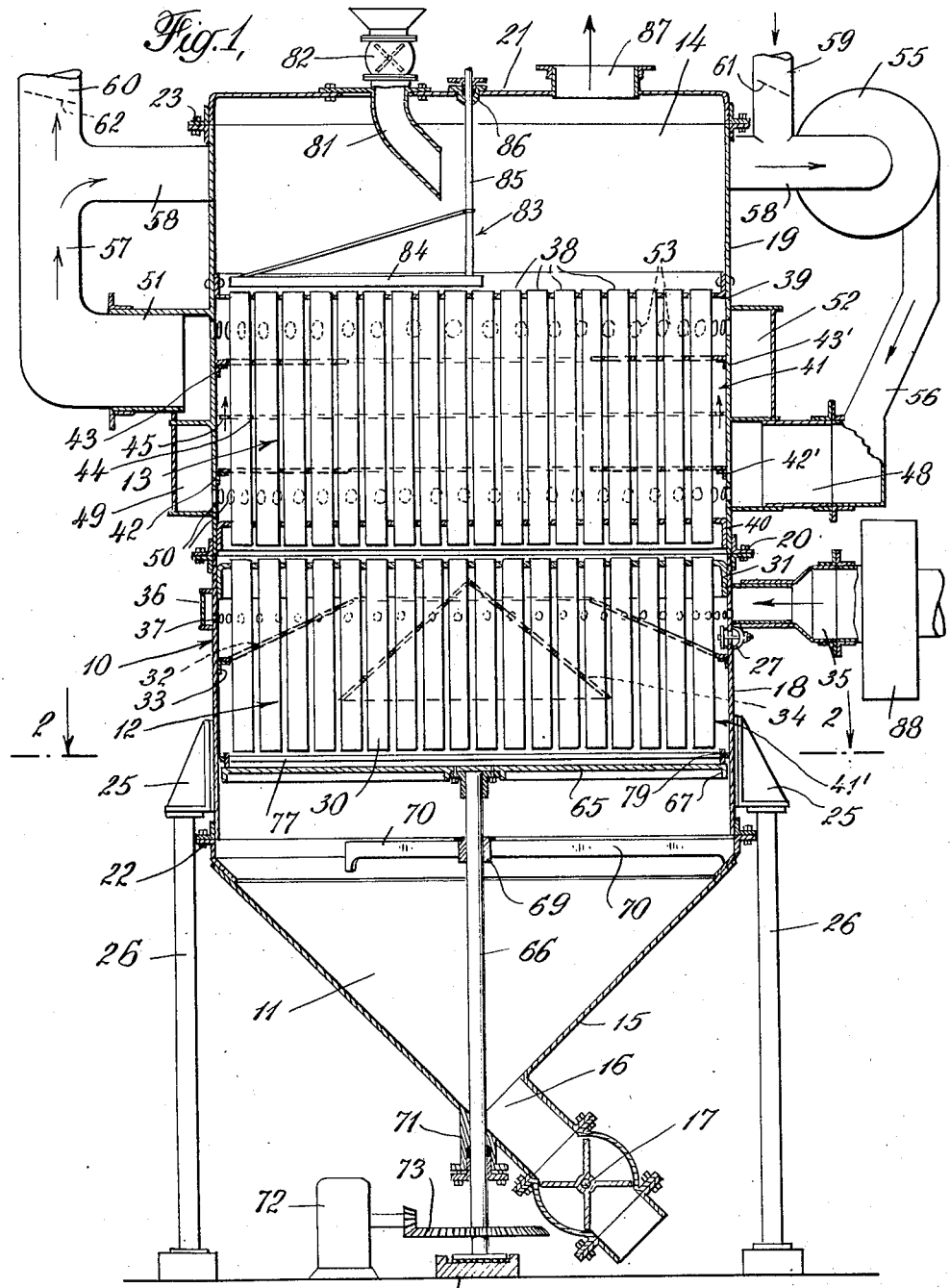

Referring to Fig. 1, the converter consists of a substantially cylindrical shell, indicated generally at 10, having a hopper section 11, converter sections 12 and 13, and an upper chamber 14. Hopper section 11 is provided with a substantially funnel-shaped bottom 15 terminating in an outlet 16 having therein an air-lock valve 17 of any approved construction.

In the embodiment of the invention illustrated, shell 10 comprises the cylindrical sheet steel sections 18 and 19 fastened together in alignment by bolts or rivets through the flanges 20 which in turn are riveted or otherwise suitably secured to the adjacent edges of the sections 18 and 19. The funnel-shaped bottom 15, and the crown sheet 21, forming the top of the shell, are fastened to the shell sections 18 and 19 by means of similar flanges 22 and 23. The lugs 25 are attached to the lower shell section 18 at intervals as shown in Fig. 2, and together with posts 26 serve to support the converter in an upright position. Lower section 18 is provided with a series of handholes 27 appropriately spaced about the circumference of the section.

The converter section 12 consists of a series of tubes or casings 30 set into and supported at their upper ends by the horizontally disposed tube sheet 31. The tube sheet 31 is riveted or bolted to the lower shell section 18 near its upper edge. The joints between the tube sheet 31 and the tubes 30 need not be strictly gas-tight, as leakage of small quantities of gas through the tube sheet into the upper reaction chambers is of no consequence. The baffle plate 32, formed similarly to the frustum of a cone, is suitably attached to and supported at its outer edge by a circular flange 33 on the interior of the section 18. The baffle 32 is provided with the necessary openings to permit the passage of the tubes 30 which fit more or less tightly in the said openings. The centrally disposed cone-shaped baffle 34 is also drilled at suitable intervals to provide openings for the tubes 30. Baffle 34 is supported in the position shown by the frictional engagement of the outer surfaces of the tubes 30 and the edges of the holes in the baffle sheet. On account of the arrangement of the baffle sheets, it will be seen that the tubes 30, though supported only by the single tube sheet 31, are rigidly held in position.

Gas to be treated in the converter is admitted to the lower converter section 12 through the inlet 35 connected to the bustle pipe 36 which encircles section 18 near its upper edge. Connection between the bustle pipe 36 and the heat transferrer section, indicated generally at 41', and formed by a portion of the section 18, tube sheet 31 and the exterior of the tubes 30, is established by a series of equally spaced holes 37 in the shell section 18. It will be apparent that on account of the arrangement of the baffles 32 and 34 as illustrated, the gas, before entering the tubes or reaction chambers 30, is first caused to circulate about the upper ends of the tubes and then to pass downwardly in a direction generally counter current to the flow of gas passing through the tubes 30. The baffle 34 is punched at suitable intervals to permit the passage of some of the downgoing gases through the baffle to circulate in heat transfer relation with the exterior of those portions of the tubes 30 directly under the baffle 34.

The upper converter section 13 consists of a similar series of tubes 38 which are set tightly at their upper and lower ends, in the manner well known in boiler construction, into the horizontally disposed tube sheets 39 and 40. The tubes 38 of the upper converter section 13 are in substantial alignment with the tubes 30 of the lower converter section 12. The lower ends of the tubes 38 project below the lower tube sheet 40, but terminate some little distance above the upper ends of the tubes 30 of the lower converter section. It is to be understood that the tubes 30 and 38 might be continuous instead of being constructed in two sections, and the purposes of the invention still accomplished, but for the purpose of facilitating manufacture and repair, the arrangement illustrated is preferred. In the event that the tubes 38 and 30 are connected to form single units, it will of course be necessary if tube sheet 40 is omitted, that the connections between the tubes and the tube sheet 31 be gas-tight to prevent leakage of gas upwardly into the heat transferrer section surrounding the tubes 38.

In the present construction, the tube sheets 39 and 40, together with a portion of the shell section 19, and the exterior of the tubes 38, form the heat transferrer section indicated generally at 41. The heat transferrer section is provided with horizontally disposed annular baffle plates 42 and 43 attached to and supported at their outer edges by the circular flanges 42' and 43' on the inner surface of the shell section 19. The horizontal circular baffle plate 44 is also included in the heat transferrer section 41, and is disposed, as illustrated, about midway between the annular baffles 42 and 43. The baffle sheet 44 is solid except for a series of holes 45 disposed immediately adjacent the shell section 19. Baffles 42, 43 and 44 are each drilled as required to permit passage of the tubes 38.

Air or other fluid cooling medium is introduced into the lower end of the heat transferrer section through the inlet pipe 48 connected to the bustle pipe 49 constructed around the lower end of the heat transferrer section 41. Connection between the bustle pipe 49 and the lower end of the heat transferrer section is established by means of a series of holes 50 in the shell section 19. The cooling medium is withdrawn from the transferrer section through the outlet 51 connected to the bustle pipe 52 which encircles the converter near the upper end of the heat transferrer section 41. The bustle pipe 52 is in turn connected to the upper end of the transferrer section by a series of holes 53 in the shell.

From this construction it will be apparent that a gaseous cooling medium entering the transferrer section from the inlet 48 will be caused to circulate about the exterior of the tubes 38, and pass through the heat transferrer section in a direction co-current with the gas flowing through the tubes 38.

Circulation of the cooling medium in the heat transferrer section 41 is maintained by the blower 55, the pressure side of which is connected to the inlet pipe 48 through the pipe 56. The transferrer outlet 51 is connected to the inlet of the blower 55 through pipes 57 and 58. Communication between the circulatory system and the atmosphere is effected by means of the inlet pipe 59 and the outlet pipe 60, each controlled respectively by dampers 61 and 62. The blower 55 and the associated pipe connections are illustrated diagrammatically only. If desired, instead of air, sulfur dioxide gases which have been previously cooled, for example during purification, may be circulated through the transferrer section 41 prior to introduction into the converter inlet pipe 35. This mode of operation might be desirable when operating with gas derived from a pyrite burner in which case the gases may be cooled during purification to a temperature considerably less than the optimum initial conversion temperature. When it is desired to circulate sulfur dioxide gases through transferrer section 41 for the purpose of removing heat of reaction and preheating the sulfur dioxide gases, prior to the introduction of the same into the converter tubes, the mode of operation is as hereinafter explained in connection with Figs. 5 and 6.

Catalytic material in the tubes 30 and 38 is supported by the rotary table 65 fixed to the upper end of the shaft 66. The table 65 is of a diameter slightly less than the diameter of the interior of the lower shell section 18, and is provided on its circumference with a downwardly directed flange 67 spaced inwardly from the shell section 18 sufficiently to provide the necessary clearance between the edge of the table and the shell. The vertical shaft 66 is rotatably supported at its lower end in a bearing 68, and near its upper end by a bearing 69 held in position by the arms 70 attached at their outer ends to the hopper section 11. Shaft 66 passes through a stuffing box 71 in the lower end of the hopper section 11, constructed and packed in any suitable manner to prevent the admission and passage of gas or particles of the catalytic material. The table 65 is rotated from a source of power indicated at 72 through the bevel gears 73.

The table 65 is spaced from the lower ends of the tubes 30 as shown in Fig. 3, and is provided with radial slots 75, the purpose of which will be presently apparent. A spider, indicated generally at 76, consisting of a series of scraper members 77, is disposed between the table 65 and the lower ends of the tubes 30, and is welded or otherwise attached to the shell section 18 at the ends of the scraper members 77 as indicated at 78 and shown in the enlarged detail of Fig. 4. The spider member 76 also includes a ring 79 spaced inwardly from the shell 18. The ring 79 is of a depth slightly greater than the distance between the upper surface of the table 65 and the lower ends of the tubes 30. The purpose of this construction is to prevent the passage of any substantial amount of catalytic material over the edge of the table 65 and down between the flange 67 and the shell 18 where a quantity of solid particles would tend to interfere with the rotation of the table 65. The scrapers 77 are preferably bowed as illustrated in Fig. 2, but need not necessarily be so shaped. However, it is desirable that the scrapers be formed in such manner that the entire length of a scraper will not at any time coincide with the entire length of a slot 75.

From the construction described, it will be apparent that as the table 65 rotates at a comparatively slow rate in the direction of the arrow 80, Fig. 2, catalytic material in the tubes 30 and 38 will be slowly withdrawn from the lower ends of tubes 30, and small portions of the catalytic material on the table 65 will be gradually worked through the slots 75 into the hopper section 11. It will be noted that the material of the table 65 which is punched downwardly to form the slots 75 is hammered or drawn out to form an extension 75'. The purpose of this construction facilitates the smooth removal of catalytic material without permitting the catalyst to drop directly through the slot 75 when the table is stationary.

Catalytic material may be introduced into the upper end of the converter through the inlet pipe 81 controlled by an air-lock valve 82. The catalytic material introduced through pipe 81 may be spread evenly over the surface of the tube sheet 39 by means of a leveling device 83 comprising an arm 84 secured at one end to a shaft 85 which may be rotated by any suitable means, not shown. The shaft 85 is adjustable vertically in the stuffed gas-tight bearing 86 thus permitting the arm 84 to be raised, and to thereby facilitate the maintenance of a bed of catalytic material on the tube sheet 39 of any desired depth.

After passing through the converter sections 12 and 13, the treated gas leaves the converter through the outlet 87. Gas circulation through the converter may be maintained by a blower shown diagrammatically at 88.

The improved process is carried out in conjunction with the apparatus described, as follows.

Catalytic material, preferably in pellet form, is introduced into the converter through the inlet 81 in sufficient quantities to fill all the tubes 38 and 30, to form a bed of catalytic material on the table 65, as illustrated in the detail in Fig. 3, and also a bed of catalytic material of any desired depth on the tube sheet 39.

Sulfur dioxide containing gas at a temperature of about 500° F. is introduced into the lower heat transferrer section 41' through the inlet 35. The concentration of the gas may range from 5% to 12% sulfur dioxide, and may be obtained from either a brimstone burner or a burner for sulfide ores.

On entering the lower heat transferrer section 41', the gases are first circulated around the upper ends of the tubes 30, and then pass downwardly and into the lower ends of the tubes. The spacing between the table 65 and the lower ends of the tubes 30, and the angle of repose of the catalytic material are such that the upper surface of the catalytic material takes the form of a series of small cone-shaped surfaces which present a very large surface area of fouled or partially fouled catalytic material which acts to filter out the impurities of the gases, and thus prevents rapid accumulation of resistance in the catalytic material at the mouths of the several tubes 30.

As is well known, reactions of the type referred to are exothermic, and large quantities of heat are evolved. The length of the tubes 30 is such that the greater part of the reaction of the conversion of sulfur dioxide to sulfur trioxide is effected in the converter section 12. The heat liberated by the reaction in the tubes 30 is removed and utilized to preheat the gases entering through inlet 35. It will be observed that the hottest parts of tubes 30 are those upper portions approximately adjacent the tube sheet 31. On account of the construction illustrated, the cool incoming gases are caused to circulate first in contact with the hottest parts of tubes 30 and then pass downwardly to the lower end of the tubes flowing counter current to the gas passing through the tube. By the time the gases reach the lower ends of the tubes 30, the temperature will have been raised to about 800° F.

On leaving the converter section 12, at a temperature around 875–900° F., the gases pass upwardly through tubes 38, and the conversion of the sulfur dioxide to sulfur trioxide continues to completion. The excess heat of reaction is rapidly and efficiently removed from the second stage of the reaction by means of the cooling medium entering from the conduit 48, circulating through the transferrer section 41, contacting the exterior of the tubes 38, and flowing co-currently with the gases passing through the tubes. The co-current flow of the cooling gases and the gases passing through the catalyst is of primary importance for the efficient operation of the process. The cool gases from the inlet 48 strike the tubes 38 at the lower ends where the larger portion of the heat of reaction in the second stage is evolved. As the gases within the tubes 38 pass upwardly, the reaction becomes less vigorous and evolution of heat proceeds at a gradually decreasing rate, until at the upper ends of the tubes reaction and evolution of heat practically ceases. The temperature differential between the reacting and the cooling gases is greatest just above the tube sheet 40, and consequently the removal of heat from the reacting gases is most rapid at this point. As the reacting gases approach the upper end of the converter section 13, less heat is evolved and the necessity for heat removal correspondingly decreased. As the cooling gases rise through the transferrer section 41, the temperature of the cooling gases gradually increases and hence a decreasing amount of heat is extracted from the reacting gases. Accordingly, it will be seen that on account of the co-current flow of the reacting and cooling gases in the second stage, proper temperature control may be effected in the converter section 13 during the completion of the conversion reaction.

At the beginning of the operation, if the gases being treated were obtained from a brimstone burner, air, which has previously been heated in any suitable manner to about 400° to 600° F., is introduced into the transferrer section 41. Circulation of the air through the transferrer section is maintained by the blower 55, and the temperature of the air during subsequent operation of the process is regulated by suitable manipulation of the dampers 61 and 62. As the temperature of the air gets too high, the system may be partially purged by opening the damper 62, and admitting a corresponding quantity of fresh air by opening damper 61. When using air as a cooling medium in the upper transferrer section 41, it is preferred to so adjust the dampers 61 and 62, and control the volume of air passing through the transferrer section as to maintain the temperature of the air entering the inlet 48 close to about 600° F., and the temperature of the sulfur trioxide gas leaving through converter outlet 87 at about 825° F. The inlet temperature of about 600° F. may be lower if desired, but the higher temperature approaching 600° F. is preferable because the temperature differential at the lower ends of tubes 38 between the cooling medium and the gases in the reaction tube is thereby reduced.

As the reaction proceeds over an extended period of time, the catalytic material in the lower ends of tubes 30 becomes partially or entirely fouled. At suitable time intervals, regulated by operation requirements, the table 68 is rotated slowly for a short period of time. As the table rotates small quantities of catalytic material are pushed through the slots 75 and into the hopper section 11. It will be apparent that a small rotation of the table 65 will effect a complete change in the filtering area of the catalytic material. It will be observed that whatever amounts of catalytic material may be removed from the tubes 30 by rotation of the table, corresponding quantities will be drawn into the tubes 38 from the bed of catalytic material which is constantly maintained on the tube sheet 39. It will also be apparent that on account of the described arrangement of the table 65, the slots 75, scrapers 77, and the airlock valves 17 and 82, the entire catalytic body in the tubes 30 and 38 may be changed without any substantial interruption of the conversion process. It will further be observed that because of the co-operative relation and arrangement of the table, the slots therein, and the scrapers 77, the catalytic material is withdrawn evenly from all the tubes, and there is no comparatively rapid withdrawal of material from the tubes adjacent the periphery of the converter and a slower withdrawal from those tubes nearer the center.

If it is desired to utilize sulfur dioxide gases obtained from an ore burner or roaster, and the gases are such as to require purification with consequent cooling to about 100° F., they may, after preheating to about 400° F. in a transferrer located just ahead of the sulfur trioxide absorbers, not shown, be passed directly into the inlet conduit 90 connected to the pipe 58 which discharges into the inlet side of the fan 55 as shown in Fig. 5. The pressure side of the fan 55 is connected to the inlet 48 of the upper transferrer section by the pipe 91. The inlet 90 is also connected to the inlet 35 of the lower converter section 12 by the conduit 92 having therein the control valve 93, as indicated on the drawings. The outlet 51 of the upper transferrer section is connected to pipes 53 and 94 by the conduit 95 including therein the damper 96 located, as shown, between the connections of pipes 58 and 94 with the pipe 95. The damper 97 is included in the inlet 90 just ahead of the connection between the inlet 90 and the pipe 58 to control the admission of gases from the inlet 90 into the pipe 58.

In the operation of this modification of the invention, gases from a sulfide ore burner which have been previously purified and preheated as described to about 400° F. are introduced into the inlet pipe 90. When the conversion reaction is being initiated, it is of course necessary that the incoming sulfur dioxide gases be preheated to a much higher degree, i. e., about 750° F. In this situation, the damper 97 is closed, and the valve 93 is fully opened so that the incoming gases are conducted directly through the conduit 92 to the inlet 35 of the lower converter section 12. After the conversion process gets well under way, and it becomes necessary to remove the excess heat generated by the exothermic reaction, the circulating fan 55 is started up, valve 93 is partly closed, and dampers 96 and 97 are partly opened to commence the circulation of the cooling gas through the upper transferrer section. It will be understood that after the conversion process has been started in the converter section, the sulfur dioxide gases are introduced into the inlet 90 at a temperature of about 400° F.

Gases from the inlet 90 passing the damper 97 and entering the pipe 58, are introduced into the fan 55, discharged therefrom into the pipe 91 and conducted through the inlet 48 into the upper transferrer section. After passing through the upper transferrer section, as described in connection with Fig. 1, the heated gases are discharged therefrom through the outlet 51 into the pipe 95. According to the regulation of the damper 96, a portion of the gases from the pipe 95 pass back into the pipe 58, and the remainder passes the damper 96 into the pipe 94, and thence to the conduit 92. During normal operation, the dampers 96 and 97 are adjusted so that the quantity of cool gas entering the circulating system from the inlet 90 and the quantity of heated gas leaving the circulating system through the pipe 94 will be such as to maintain the temperature of the gas entering the inlet 48 at about 600° F. If the temperature of the gas at the inlet 48 rises, dampers 97 and 96 are opened to admit a larger quantity of cooler gas to the circulating system to discharge a greater amount of heated gas therefrom through the pipe 94. If the temperature of the gas at the inlet 48 drops off, the dampers 97 and 96 are closed somewhat to allow the gas in the circulating system to become heated to the required temperature. Generally speaking, the valve 93 and the dampers 96 and 97 are so adjusted that a sufficient quantity of gas from the inlet 90 is introduced into pipe 58 for passage through the upper transferrer section to maintain proper temperature conditions at the inlet 48 and in the upper converter tubes, the balance of gas from the inlet 90 passing the valve 93 into the conduit 92. The temperature of the gas withdrawn from the upper transferrer section circulating system through the pipe 94 is generally such that the temperature of the gas mixture in conduit 92 is about 500°–550° F., at which temperature, such mixture is introduced into the converter through the inlet 35.

In the modification shown in Fig. 6, the arrangement of the circulating conduits is somewhat the same as that described in Fig. 5 with the exception of the omission of the fan 55 and the connections thereto. In Fig. 6 the inlet 90, including the control valve 98 is connected to the inlet 48 of the upper transferrer section. The outlet 51 of the upper transferrer section is connected directly through the pipe 99 to the conduit 100. The quantity of gas passing through the inlet 90 directly into the conduit 100 is controlled by the valve 101.

In the operation of this modification of the invention, after the conversion reaction in the converter has been initiated, the valves 98 and 101 are so adjusted that a sufficient quantity of gas from the inlet 90 passes into the inlet 48 to maintain proper temperature control of the catalyst in the upper tubes of the converter. The gas entering the upper transferrer section through the inlet 48 is passed therethrough as previously described, and is discharged into the pipe 99 through the outlet 51. From the pipe 99, the gas thus heated in the upper transferrer section enters the conduit 100 and is therein mixed with the cooler gas from the inlet 90 which is by-passed through the valve 101. As the temperature of the gases entering the inlet 90 is about 400° F., approximately the same temperature prevails at the inlet 48. During the normal operation of the conversion process in the converter the temperature of the gases passed through the upper transferrer section is increased to such an extent that the temperature of the gas mixture in the conduit 100 is about 500°–550° F., at which temperature the gases are introduced into the converter through the inlet 35. For any unusual operating conditions which may be encountered, valves 98 and 101 are so manipulated as to maintain the temperature of the gas in the conduit 100 at about 500–550° F.

It is to be understood that the invention is in no way limited by the temperatures mentioned herein. It is well understood by those skilled in the art, that usually such temperatures are subject to variation over an appreciable range dependent upon changing operating conditions encountered in practice.

We claim:

1. A converter of the character described comprising a shell, a plurality of reaction chambers therein, means for feeding catalytic material into the shell and the reaction chambers, a rotary support arranged beneath and spaced from the lower end of the reaction chambers for supporting catalytic material in the reaction chambers, means for passing a gas through the reaction chambers, means for rotating the support, a hopper arranged beneath the support forming the lower end of the shell, and means including a fixed scraper disposed between the support and the lower end of the reaction chambers for removing catalytic material from the support into the hopper on rotation of the support.

2. A converter of the character described comprising a shell, a plurality of converter sections disposed in series therein, each converter section having a plurality of reaction chambers, the reaction chambers of the respective sections arranged in substantial alignment, means for passing a gas through the reaction chambers, means for circulating the gas prior to its introduction into the first converter section in heat exchange relation with the exterior of the reaction chambers of the first section, means for circulating cooling gas in contact with the exterior of the reaction chambers of a second converter section, means for feeding catalytic material into said reaction chambers, a movable support arranged beneath the reaction chambers of the first converter section, a hopper under the support forming the lower end of the shell, and means including a scraper for removing catalytic material from the support into the hopper on movement of the support.

3. A converter of the character described comprising a shell, a plurality of tubes in the shell each forming a reaction chamber, said tubes being supported by the shell and spaced therefrom so as to form between the inner surface of the shell and the outer surfaces of the tubes a gas chamber, means for feeding catalytic material into the shell, means for feeding catalytic material into the tubes, a movable support arranged beneath and spaced from the lower ends of the reaction chambers for supporting catalytic material in the reaction chambers, means for passing gas through the reaction chambers, means for moving the support, a hopper arranged beneath the support forming the lower end of the shell and means including a scraper disposed between the support and the lower end of the reaction chambers for removing catalytic material from the support into the hopper on movement of the support.

4. A converter of the character described comprising a shell, a plurality of converter sections disposed in series therein, each converter section having a reaction chamber, the reaction chamber of the respective sections arranged in substantial alignment, means for passing a gas through the reaction chambers, means for circulating the gas prior to its introduction into the first converter section in heat exchange relation with the exterior of the reaction chamber of the first section, means for circulating cooling gas in contact with the exterior of the reaction chamber of the second converter section, means for feeding catalytic material into said reaction chambers, a movable support arranged beneath the reaction chamber of the first converter section, a hopper under the support forming the lower end of the shell, and means for removing catalytic material from the support into the hopper on movement of the support.

THEODORE V. FOWLER, Jr.
ANDREW M. HARKNESS.
HENRY F. MERRIAM.
BERNARD M. CARTER.